Sept. 3, 1968   C. E. ERICKSON ET AL   3,399,464
CLOTHES DRYER
Filed Sept. 16, 1966   2 Sheets-Sheet 1
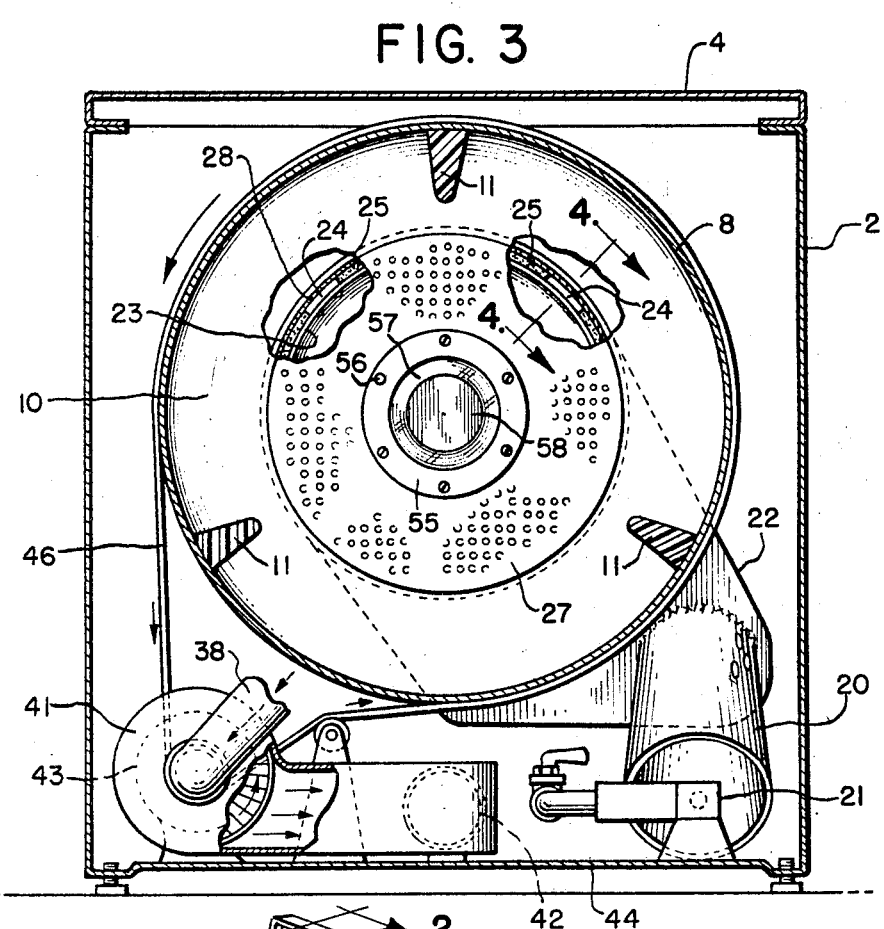
FIG. 3
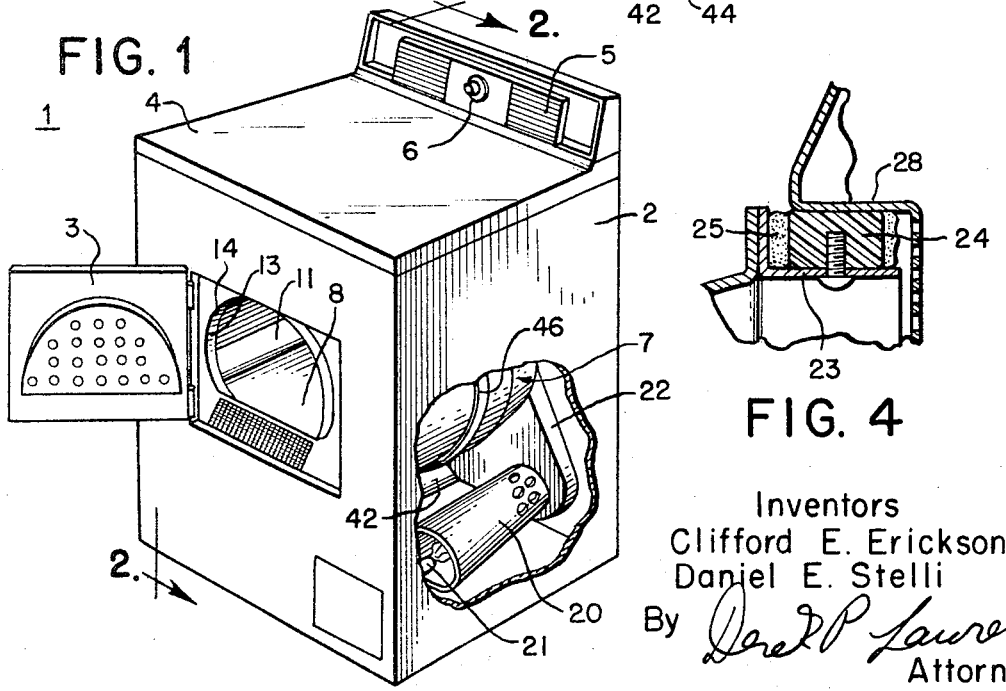
FIG. 1
FIG. 4
Inventors
Clifford E. Erickson
Daniel E. Stelli
By *Dorel P. Lawrence*
Attorney

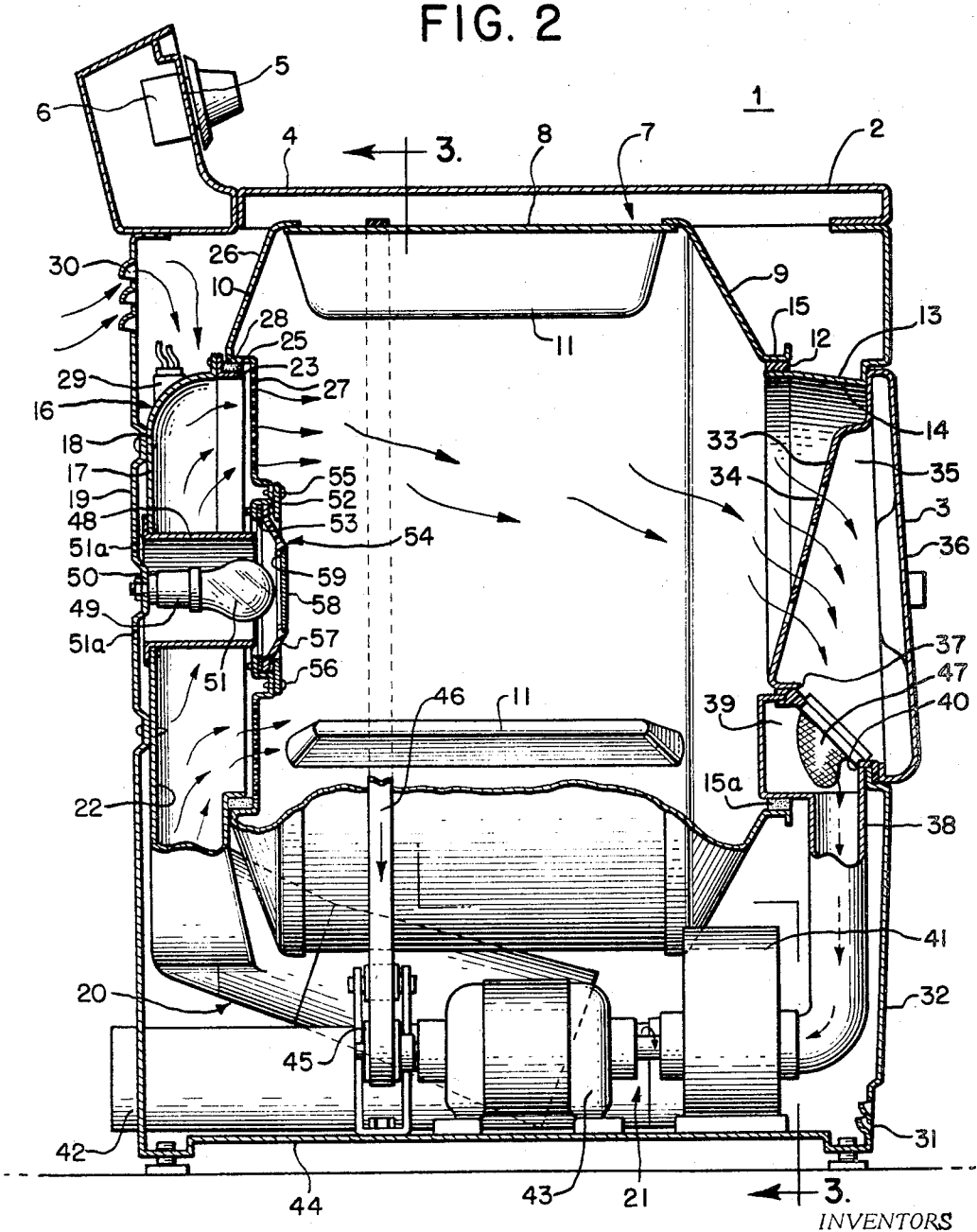

United States Patent Office 3,399,464
Patented Sept. 3, 1968

3,399,464
CLOTHES DRYER
Clifford E. Erickson, Chicago, and Daniel E. Stelli, Lombard, Ill., assignors to General Electric Company, a corporation of New York
Filed Sept. 16, 1966, Ser. No. 580,020
7 Claims. (Cl. 34—133)

ABSTRACT OF THE DISCLOSURE

A clothes dryer in which the rear wall of the drum is rotatably supported on a conduit which guides heated air into the drum. A lamp may be mounted in the conduit, centrally of the drum, to indirectly light the drum, the lamp being shielded from the heated air.

Clothes dryers of the type provided for domestic use generally incorporate a drum which rotates on a horizontal axis so that clothes may be tumbled therewithin while heated air is passed through the drum to dry the clothes. For stability, the drum should be supported at or near each end.

It is an object of our invention to provide, in a clothes dryer, an improved structural arrangement for the support of the rear end of a drum which permits the use of a conduit leading heated air into the drum as the support means for the drum; this permits a dual function to be provided by the air guiding structure, and accordingly provides a more economical arrangement which operates fully as well as the relatively more expensive structures which are presently provided.

In addition, in domestic clothes dryers, it is quite common to provide illumination so that the operator, at the end of a drying cycle, may see into the drum so as to retrieve all garments. The illumination source must be readily accessible and, in addition, should provide good illumination of a substantial area within the tub without shining directly into the eyes of the operator.

It is a further object of our invention to utilize the air guiding and support structure previously mentioned so that an effective illumination system may be provided in cooperative relationship therewith.

It is a more specific object of our invention to provide such an illumination system wherein the criteria set forth above, of ready access and indirect illumination, are provided in a simple and easy manner as a result of the cooperative relationship of the illumination source with the air-guiding and drum-supporting structure.

In carrying out our invention in one form thereof, our improved clothes dryer is provided with a housing which, in the usual manner, has front and rear walls. A generally cylindrical fabric-receiving drum, open at each end, is positioned within the housing on a horizontal axis, the drum extending between the front and rear walls. The front end of the drum is supported by an appropriate support structure, and communicates with a conduit which receives air after it has passed through the drum.

A second conduit is provided in communication with the opening at the rear end of the drum so as to guide heated air into the drum. This second conduit is formed so as to provide a rotatable support for the rear end of the drum, and, in turn, to be supported at its rear by the rear wall of the housing. Thus, the conduit means is positioned between the rear wall of the housing and the rear of the drum, and provides the double function of air guidance and drum support. The dryer is provided in the usual manner with heating means and air circulation means, so that air is drawn in through the second conduit, being heated before it enters the drum, and is then passed through the drum into the first conduit.

This structure provides an exceedingly simple and economical support for the rear end of the drum. It also eliminates any center bearing at the rear of the drum as has conventionally been provided, thereby providing space for a source of illumination to be centrally positioned behind the drum. We prefer to provide such a source in cooperative relationship with a generally frusto-conical annulus of transparent or translucent material. An opaque central section is directly in front of the source of illumination; this results in a substantial amount of light passing through the transparent frusto-conical section so as to illuminate the inner surface of the peripheral wall of the drum.

The subject matter which we regard as our invention is particularly pointed out and distinctly claimed in the concluding portion of this specification. Our invention, however, both as to organization and method of operation together with further objects and advantages thereof, may best be understood by reference to the following description taken in conjunction with the accompanying drawings.

In the drawings, FIGURE 1 is a view in perspective, partly broken away, of a clothes dryer in which our novel structure is incorporated;

FIGURE 2 is a cross-sectional view, partly broken away, along line 2—2 in FIGURE 1;

FIGURE 3 is a cross-sectional view, partly broken away, along line 3—3 in FIGURE 2; and FIGURE 4 is an enlarged fragmentary cross-sectional view along line 4—4 in FIGURE 3.

Referring to FIGURE 1, a domestic clothes dryer 1 is provided in the usual way with a cabinet 2 having front door 3 to provide access to the interior of the cabinet for loading and unloading clothes. Mounted on the top wall 4 of cabinet 2 is a control panel 5 which may in the conventional way include suitable controls generally indicated at 6. Controls 6 are used to cause the machine to start and proceed through a desired cycle of operation; such controls are standard in virtually all clothes dryers presently available to the public, and therefore will not be further discussed herein.

Within cabinet 2, there is provided a clothes tumbling container or drum 7 mounted for rotation on a substantially horizontal axis perpendicular to the front and rear of the cabinet. Drum 7 is substantially cylindrical in shape, having an outer cylindrical wall 8, a front wall 9, and a back wall 10. The outer wall 8 is imperforate over its entire length; on the interior surface thereof, there are provided a plurality of clothes tumbling ribs 11 so that clothes are lifted up when the drum rotates and then tumble back down to the bottom of the drum.

The front of drum 7 is rotatably supported within outer casing 2 by a pair of suitable bearing pads 12 secured on a circular flange 13 forming the inner part of the loading opening 14 normally closed by door 3. Preferably, one pad is positioned on each side of the highest point of flange 13 so as to provide a stable support for the outwardly turned flange 15 formed at the inner edge of drum wall 9. The remainder of the space between flanges 13 and 15 may be filled in any suitable way, such as by the felt shown at 15a. This provides an air seal between flanges 13 and 15 preventing leakage of air therebetween.

We contemplate the provision of a generally circular baffle member 16 having a rear portion 17 rigidly secured at a number of points 18 to the back 19 of cabinet 2 by any appropriate means, such as welding for instance. Baffle 16 acts as a conduit receiving air from a system generally indicated by the numeral 20, so that air heated in system 20, by any conventional means such as gas heating system 21, may be guided up to baffle 16 through conduit 22, herein formed as integral part of the baffle.

Baffle 16 has a front portion 23 formed as a circular flange. Portion 23 has a pair of nylon support pads 24 rigidly secured to the outer surface thereof. References to FIGURES 3 and 4 shows most clearly how pads 24 are secured to flange 23. As with the front of the machine, the pads are preferably provided one on each side of the center uppermost part of flange 23. Between the pads 24, the remainder of the circumferential space is filled with felt as shown at 25.

The back wall 10 of drum 7 has a radially outer imperforate annular section 26 and a radially inner annular perforated section 27. The two are joined by a horizontally extending shoulder 28 which is formed so as to seat on the nylon pads 24 so as to be in generally air-tight relationship with the pads 24 and felt 25 secured on flange 23 of baffle 16. It can thus be seen that the rear of drum 7 is supported by pads positioned at a location substantially removed from the axis of the rotating drum. Baffle 16 performs a double function: first, it guides the heated air up between the rear wall 10 of the drum and the rear wall 19 of the cabinet so that the air may enter through the perforations in section 27 and flow in an axial direction through the drum; second, it provides a support for the rear wall of the drum, being secured at its rear to the wall 19 of the cabinet and supporting at its front the rear wall of the drum.

The extent of heating of the air entering, shown by the arrows in FIGURE 2, may readily be controlled in a conventional way such as, for instance, by the thermostat 29. Thermostat 29 is positioned so that it will sense the temperature of the air entering drum 7 and will control the heating means so as to prevent this air from becoming too warm.

It will be further understood that any suitable means may be provided so that air may enter the cabinet 2 for introduction into the clothes drying system. In the present case, louvers 30 are provided in back wall 19 and louvers 31 are provided in front wall 32.

Door 3 includes a baffle 33 formed with openings 34 which permit the passage of air but preclude clothes tumbling within drum 7 from passing into the space 35 between the outer panel 36 of door 3 and the inner panel, or baffle, 33. The bottom of door 3 has an opening 37 communicating with the space 5 formed within the door.

An outlet duct 38 has a top portion 39 provided with an opening 40 which is inregistry with opening 37 when door 3 is closed. Duct 38 then extends downwardly into communication with a blower 41 which expels air entering it from duct 38 through an outlet duct 42. Outlet duct 42 is preferably then vented to the exterior in any suitable manner (not shown).

The blower 41 is directly driven by an electric motor 43 supported on base 44 of the dryer. In addition to driving blower 41, motor 43 constitutes the means for effecting rotation of drum 7, being provided on its shaft with a small pulley 45. A belt 46 extends around pulley 45 and entirely around the cylindrical wall 8 of drum 7. The relative circumferences of pulley 45 and drum 7 cause the drum to be driven by the motor at a speed suitable to effect tumbling of the clothes therein. Thus the air is pulled into the drum after having been heated and guided through conduit 22 into baffle 16, and then is passed from the drum to the perforations 34 in the door 3, into the conduit 38 of blower 41, and out through conduit 42. In the conventional manner, a suitable lint trap 47 may be provided to seat in the opening 40 so as to catch lint which is carried off the clothes by the moving air.

At the same time that this passage of air is carried on, the fabrics in the drum are tumbled so that the heated air passing through the clothes causes vaporization of moisture from the clothes. The vapor is carried off with the air as it passes out of the machine.

It will readily be seen that the construction at the rear of the drum provides not only for guidance of the warm air to the drum so that it may enter the drum axially in the desired manner for optimum drying of fabrics, but also provides the single connection and support between the rear wall 19 of the cabinet and the rear wall 10 of the drum, spacing the drum rear wall forwardly of the cabinet rear wall and providing a substantially air-tight connection so that the pre-heated air may be guided directly into the drum without undesirable leakage.

As previously mentioned, it is highly desirable to provide illumination for the interior of drum 7 when the operator wishes to unload clothes from the drum. If no such illumination is provided, or if the illumination is poor, or if the light shines directly in the operator's eyes, then it is possible for a garment to be inadvertently left in the drum 7. We provide, with the construction at the rear of the drum, a highly effective and attractive lighting arrangement. Specifically, the baffle 16 may have rigidly secured at the center portion thereof a tubular shield member 48. Within this member, preferably positioned on the axis of rotation of the drum, is a light bulb socket 49 rigidly secured to the rear wall 19 at 50 as shown and provided with suitable electrical connections (not shown). Within the socket 49, an appropriate source of illumination, such as bulb 51, is provided. Openings 51a in back wall 19 may be provided within member 48 to permit entrance of cooling air.

Within the perforated section 27 of rear wall 10 of drum 7, an annular mounting boss 52 is provided, a recessed area 53 being formed directly therewithin. A central circular member 54 may be seated wtihin the recess 53, and secured therewithin by an annular member 55 rigidly secured to boss 52 by any suitable means such as, for instance, threaded members 56.

Circular member 54 has a frusto-conical section 57 formed so that if it were continued to form a full cone, its apex would lie within drum 7 on the axis of rotation thereof. The frusto-conical section 57 is translucent, so that the beams of light from bulb 51 may pass through to illuminate the interior of drum 7. More particularly, this provides illumination for the peripheral wall 8 of the drum 7, lighting up clothes which are lying therewithin at the time that an unloading operation is conducted.

Preferably, the central portion 58 of member 54 is opaque. This may be effected either by having a separate member of metal secured in space 59 formed at the top of the frusto-conical section; or else a single piece of translucent material may be used, with the center portion 58 being painted so as to be opaque. In either event, the rays of light are guided to the peripheral wall of the drum and are prevented from shining directly in the user's eyes. The light bulb 51 is easily accessible for changing should it burn out, simply by removing the small number of threaded members 56 which secure the member 54 in place. This may be made even easier by using clips or other similar structure instead of members 56.

It will thus be seen that in addition to a great deal of economy in the supporting and air guiding structure at the rear of the drum, it permits the use of an illuminating arrangement which is highly effective in throwing light on that portion of the inner surface of the drum where clothes may be difficult for an operator to see, while at the same time, direct light in the eyes of the operator is avoided, and replacement of the bulb is facilitated, further, the bulb is protected under normal use conditions.

While in accordance with the patent statutes we have described what at present is considered to be the preferred embodiment of our invention, it will be obvious to those skilled in the art that various changes and modifications may be made therein without departing from the invention, and we therefore aim in the appended claims to cover all such changes and modifications as fall within the true spirit and scope of our invention.

What we claim as new and desire to secure by Letters Patent of the United States is:

1. A fabric-drying machine comprising:
 (a) a housing having front and rear walls;
 (b) a generally cylindrical fabric-receiving drum positioned within said housing on a horizontal axis extending perpendicular to said walls, said drum having front and rear walls defining openings therein for the passage of drying air;

(c) first support means for rotatably supporting the front end of said drum;

(d) first conduit means in communication with said opening in said front wall of said drum;

(e) second conduit means in communication with said opening in said rear wall of said drum, said second conduit being supported by said rear wall of said housing;

(f) said second conduit means having a front outer flange formed to provide a means for rotatably supporting said rear wall of said drum;

(g) said rear wall of said drum including an imperforate radially outer annular section and a perforated radially inner section, said two sections being joined by a generally horizontally extending annular shoulder arranged to seat on said supporting means provided by said second conduit means, whereby said drum is supported for rotation within said housing;

(h) heating means; and (i) air circulating means for moving air past said heating means and then into and out of said drum through said conduit means.

2. The machine defined in claim 1 wherein said air circulating means is positioned downstream of both said conduit means thereby to create a subatmospheric pressure within said drum.

3. The machine defined in claim 1 wherein said rear wall of said drum includes an imperforate center section radially inward of said perforated section, said center section being formed at least in part of translucent material, and a source of illumination secured substantially on the axis of rotation of said dryer so as to provide light to the inside of said drum through said center portion of said rear wall.

4. The machine defined in claim 3 wherein said center portion is removable to give access to said source of illumination for servicing thereof.

5. The machine defined in claim 3 wherein said center portion includes an opaque center section and a surrounding translucent frusto-conical section having an apex within said drum on the axis of rotation thereof.

6. The machine defined in claim 3 wherein a tubular shield is rigidly secured about said source of illumination, separating it from the remainder of the interior of said second conduit so as to protect it against the warm air entering said drum.

7. The apparatus defined in claim 6 wherein said rear wall of said cabinet has openings formed therein about said source of illumination within said tubular shield.

References Cited
UNITED STATES PATENTS

| | | | |
|---|---|---|---|
| 2,752,694 | 7/1956 | McCormick | 34—133 XR |
| 2,886,901 | 5/1959 | Whyte et al. | 34—133 |
| 2,959,867 | 11/1960 | Doty | 34—133 XR |
| 3,000,108 | 9/1961 | Jones et al. | 34—133 |
| 3,270,436 | 9/1966 | Fairgrieve | 34—133 XR |
| 3,331,141 | 6/1967 | Jacobs et al. | 34—133 |
| 3,333,346 | 8/1967 | Brucken | 34—133 XR |

FREDERICK L. MATTESON, JR., *Primary Examiner.*

H. B. RAMEY, *Assistant Examiner.*